Figure 3:
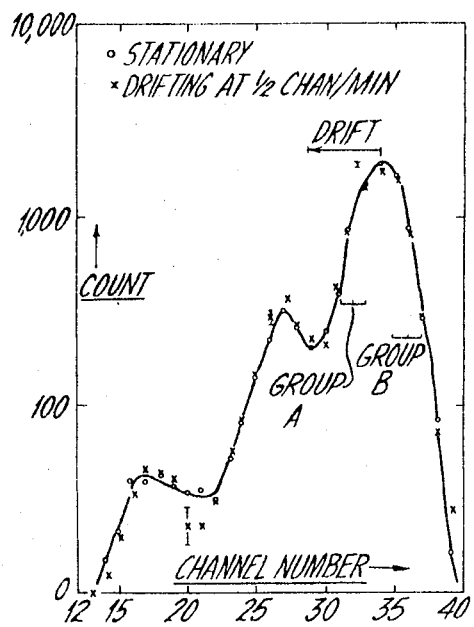

Aug. 30, 1966  J. A. LADD ET AL  3,270,205
DIGITAL SPECTRUM STABILIZER FOR PULSE ANALYSING SYSTEM
Filed Feb. 13, 1963  4 Sheets-Sheet 1
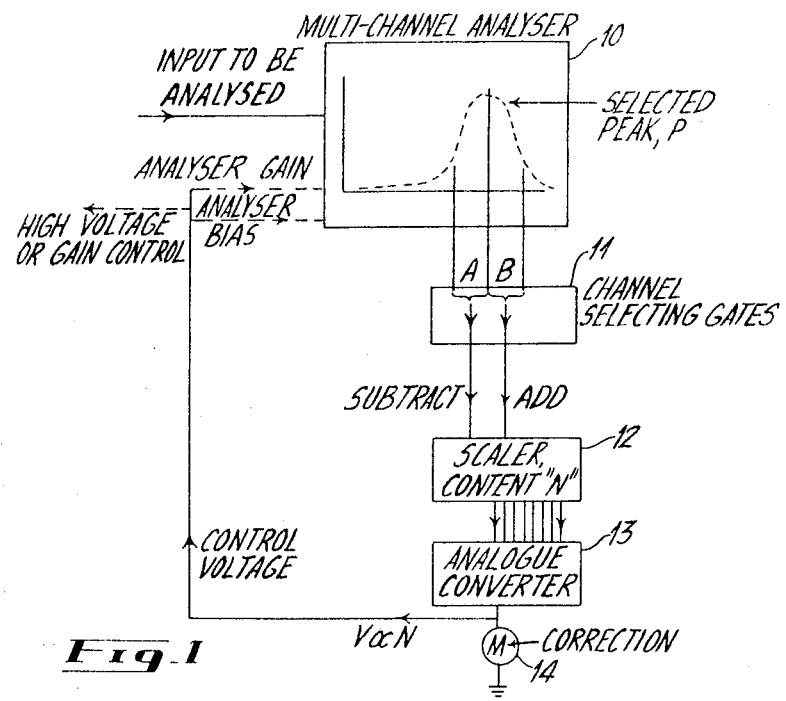
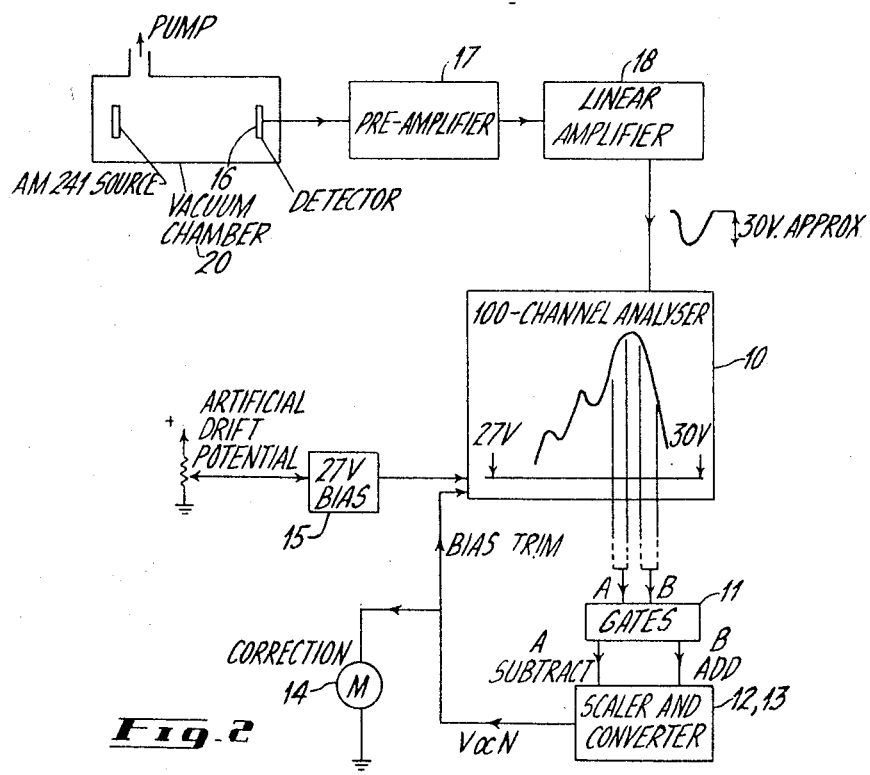
Inventors
James A. Ladd
James M. Kennedy Aug. 30, 1966  J. A. LADD ET AL  3,270,205
DIGITAL SPECTRUM STABILIZER FOR PULSE ANALYSING SYSTEM
Filed Feb. 13, 1963  4 Sheets-Sheet 2

Inventors
James A. Ladd
James M. Kennedy

Schlesinger, Schlesinger & Arkwright
attorneys

Inventors
James A. Ladd
James M. Kennedy

United States Patent Office 3,270,205
Patented August 30, 1966

3,270,205
DIGITAL SPECTRUM STABILIZER FOR PULSE
ANALYSING SYSTEM
James A. Ladd and James M. Kennedy, Deep River, Ontario, Canada, assignors to Atomic Energy of Canada Limited, Ottawa, Ontario, Canada, a corporation
Filed Feb. 13, 1963, Ser. No. 258,243
6 Claims. (Cl. 250—83.3)

The present invention relates to a stabilizer for a digital pulse height or time-of-flight analyser of the type frequently used for spectral analysis of the output from radiation detectors. The stabilizer of the present invention is particularly suited for use with analysers of the type shown in Manual No. IM-45 published by Atomic Energy of Canada Limited in July 1958.

In many physics experiments, multi-channel analysers are used to record pulse-height or time-of-flight spectra, nuclear events being recorded by classifying a pulse height or a time into a numerical category. The total number of events in a category, or "channel," may be plotted against the channel number thereby giving a characteristic spectrum of the phenomenon under investigation.

Pulse height analysers normally provide a number of channels into which incoming pulses are sorted, according to their amplitudes. Provision is made to apply a bias voltage to the analyser so that only pulses in excess of a certain minimum amplitude are counted. Provision is also made in the analyser to control the width of the individual channels into which the pulses are sorted prior to storage. Instability in either the effective system bias or channel width will degrade the pulse analysis by permitting pulses of the same amplitude to be sorted into different channels at different times. This lack of stability results in a degradation in the resolution of the pulse height analyser and a decrease in the accuracy of the analysis.

In radioactivity measurements, pulse height analysers are frequently used with semiconductor detectors and scintillation counters. The resolution presently attainable for α particles with semiconductor detectors is approximately 22 kev. Thus, if a pulse height analysis is being carried out on 5 mev. particles, it is necessary to have a pulse height analyser which will drift over the period of measurement less than 0.1% if the maximum semiconductor detector resolution is to be obtained.

Apparatus for pulse height analysis of the output of a semiconductor radiation detector usually includes a low noise pre-amplifier, a linear amplifier with differentiation and integration, and a multi-channel analyser incorporating a bias or "cut" circuit and an expander amplifier. Such apparatus permits the examination of a small section of a spectrum with a dispersion of say .1% per channel over the upper 10% of the range. Unfortunately, such equipment is not capable of .1% overall stability over long periods and it is necessary to resort to a method of detecting and correcting drifts even after all conventional measures have been taken in the design of stable amplifying and analysing circuits.

The resolution requirements are not so stringent with scintillation counters which include a photo-multiplier. The photo-multiplier output, however, is likely to drift due to cathode fatigue and, accordingly it is also necessary to provide compensation for this drift if the maximum resolution is to be obtained in a pulse height analysis.

Thus, there are at least three important sources of drift which will degrade the resolution of a pulse height analysis of radiation. These sources of drift are: changes in the analyser bias; changes in the channel width due to changes in pulse height analyser gain; and changes in amplification of pre-amplifiers, amplifiers or radiation detectors. Changes in amplification of amplifiers, pre-amplifiers and radiation detectors connected ahead of the pulse height analyser can be compensated by appropriate changes in analyser bias or conversion gain and thus two types of correction are required to obtain the maximum resolution. Changes in amplifier gain or analyser bias may be corrected by applying an appropriate signal to vary either the system gain or the analyser bias to correct for the drift, and changes in the effective channel width in the analyser may be corrected by controlling the gain of the internal analyser analogue-to-digital converter. Thus, there are two variables which must be adjusted and ideally two stabilizing devices should be used, one controlling analyser bias, and the other controlling the analyser channel width. For such an idealized stabilizer, it would be necessary to have two reference peaks near opposite ends of the observed spectrum to provide the proper stabilization.

Attempts previously have been made to stabilize the operation of pulse height analysers so that the maximum resolution of the analyser may be obtained. Various stabilizing techniques have been developed for use in photo-multiplier correcting systems. In these known systems, the sensitivity of the photo-multiplier system is held constant by monitoring the position of a peak in the output spectrum and a control signal is produced which varies the multiplier supply voltage to correct for shifts. Such known devices normally use a pair of single channel analysers in association with the multi-channel analyser. The single channel analysers are set to adjacent channels straddling the selected peak in the output spectrum and the difference in counts between the two channels is used to control the power supply for the photo-multiplier to maintain a constant system sensitivity. It can be seen that if the gain of the photo-multiplier, or any associated amplifier, were to change, the relative counting rates in the adjacent channels would change, producing a control voltage which would adjust the power supply to compensate very largely for the initial change in sensitivity.

This known type of stabilizer has several disadvantages. Firstly, drifts of the single and multi-channel analyser settings relative to each other are not compensated. For example, a drift in the multi-channel analyser causing the selected peak in the pulse height spectrum to shift would not cause a corresponding correcting voltage to be applied to the photo-multiplier. Secondly, if counting is stopped for any reason, the generated correction disappears. Thirdly, adjustments must be made to the circuit deriving the difference between the counts in adjacent channels to suit the rate of arrival of pulses, and fourthly, stability problems can arise because the stabilizer, together with the photo-multiplier and associated amplifiers, constitutes a closed loop servo mechanism which is subject to all the stability problems which can arise with such closed loops.

The present invention provides a stabilizer for pulse height analysers which overcomes the problems of known stabilizers and in particular is adapted to compensate for all system drifts regardless of their source. In accordance with the present invention, such a stabilizer comprises channel selecting gates for selecting a pair of groups of adjacent analyser channers straddling a selected feature of the spectrum being analysed, a scaler adapted to provide an output indicative of the difference in the number of counts in adjacent groups of channels, a digital-to-analogue voltage converter adapted to provide a variable output voltage proportional to the said difference and means for varying a control variable of said pulse height analyser in accordance with said variable voltage. Alternatively, means are provided for varying an input to said pulse height analyser in accordance with the variable voltage generated by the apparatus. Preferably, a spectral peak is the feature whose position is monitored by the channel groups. Thus, the correction is derived from the counts of actual channels in the pulse height analyser and no problem arises regarding differential drift rates between the stabilizer and the pulse height analyser. Similarly, the derived voltage may be used to control the detector gain, the intermediate amplifier gain, the analyser bias, the analyser channel width, or more than one of these variables, to stabilize the pulse height analysis, so that the maximum resolution may be obtained from the pulse height analyser.

In accordance with a further feature of the invention, more than one stabilizer constructed as outlined above may be used with a particular pulse height analysis system, so that simultaneous control of more than one variable can be achieved.

Figure 6:
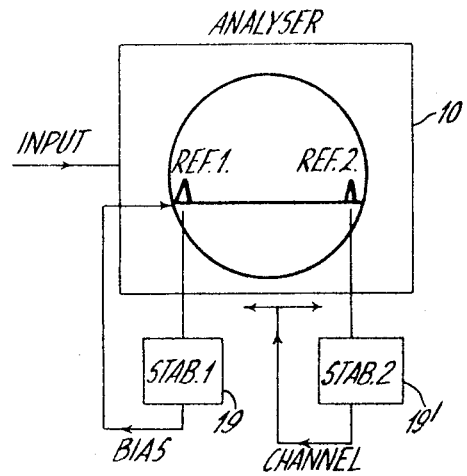
Figure 5:
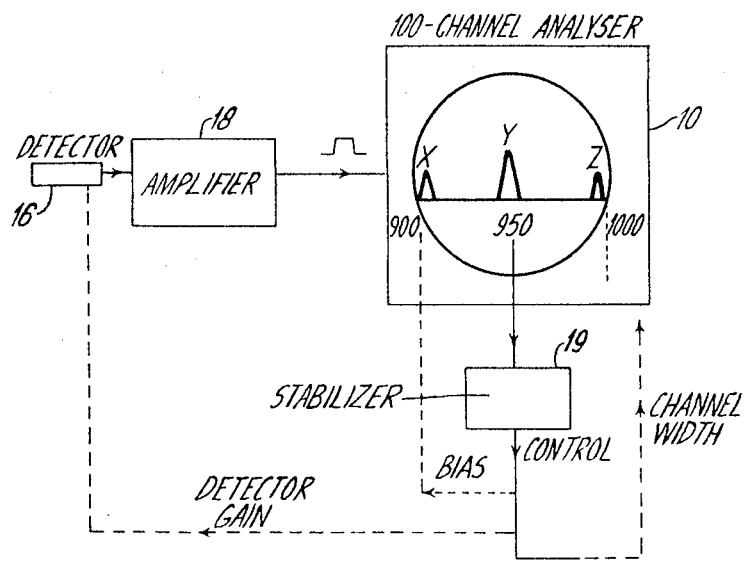
Figure 4:
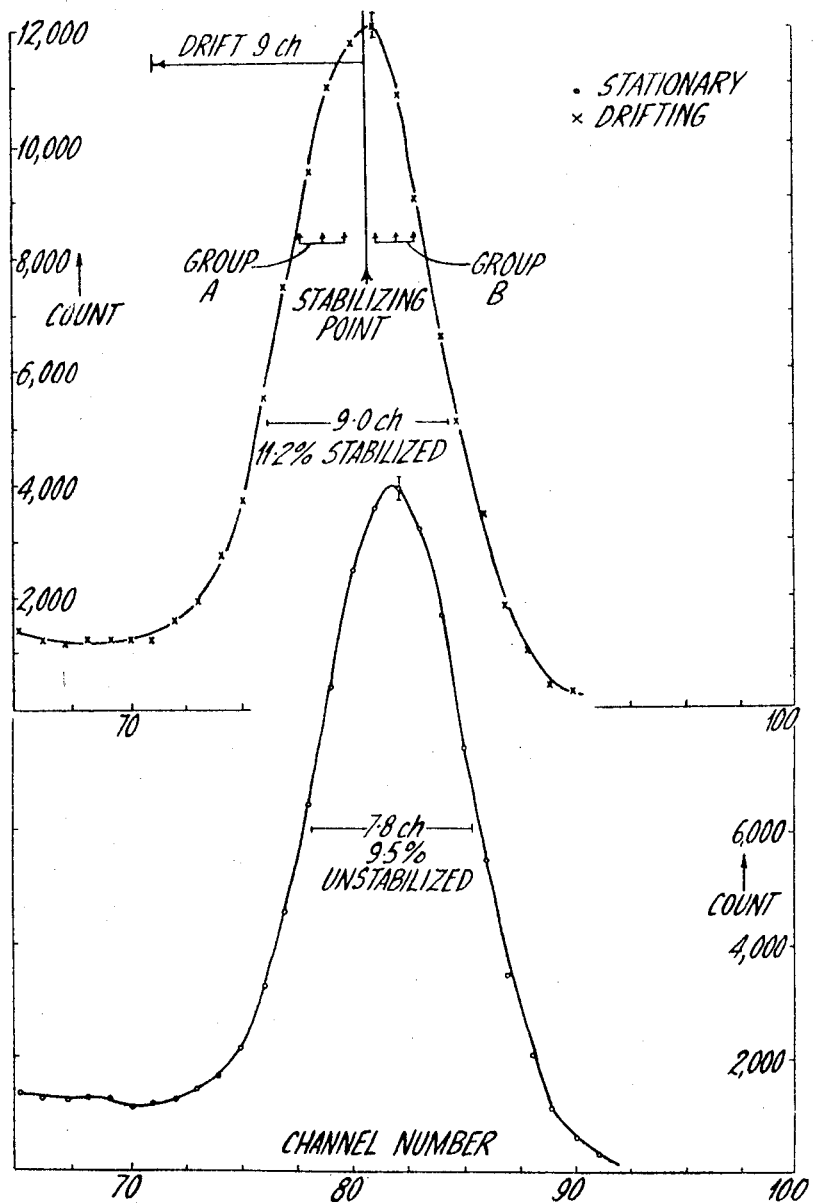
Figure 7:
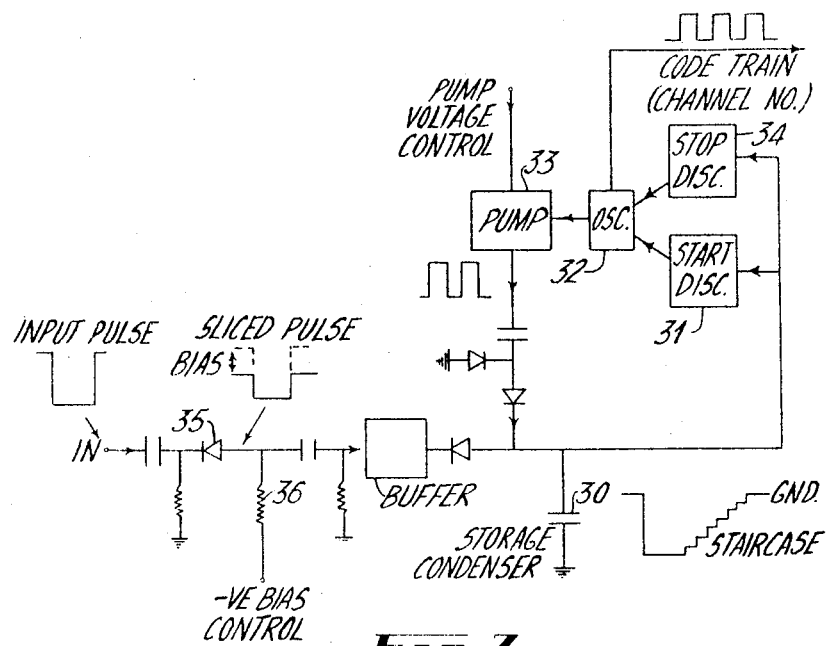
Figure 8:
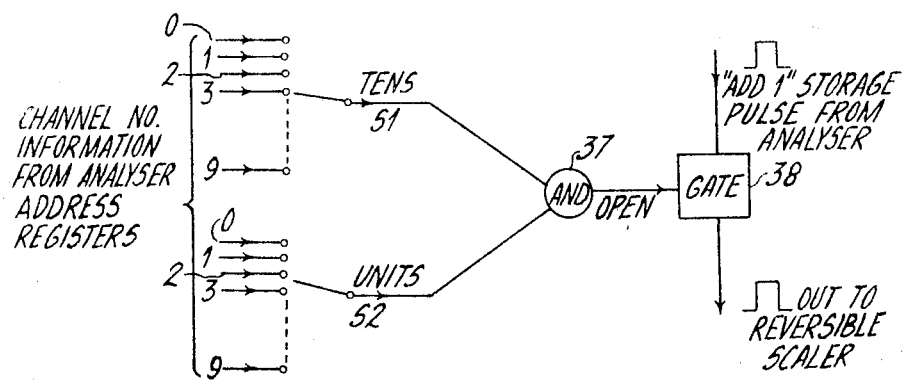

In drawings which illustrate embodiments of the present invention:

FIGURE 1 is a block diagram of a pulse height analysing system constructed in accordance with the teachings of the present invention, FIGURE 2 is a block diagram illustrating a system for measuring the resolution of a pulse height analyser constructed in accordance with the present invention, FIGURE 3 is a graph of the number of counts versus channel number for a pulse height analyser stabilized in accordance with the present invention. Two spectra are shown, one stationary and one to which an artificial drift has been affixed, FIGURE 4 is a graph illustrating the spectrum of a pulse height analyser equipped with the stabilizing system of the present invention, operating unstabilized and stationary and operating stabilized with an artificial drift of 9 channels applied, FIGURE 5 is a block diagram of apparatus constructed in accordance with the present invention, illustrating the application of correcting signals to different elements of a pulse height analysing system, FIGURE 6 is a block diagram illustrating simultaneous use of two stabilizers constructed in accordance with the present invention, FIGURE 7 is a simplified schematic and block diagram illustrating the operation of a typical multi-channel pulse height analyser, and FIGURE 8 is a schematic block diagram illustrating the operation of the channel selecting gates constructed in accordance with the teachings of the present invention.

As shown in FIGURE 1, an input pulse height spectrum to be analysed is fed into the multi-channel analyser 10, which is shown in block form and a selected peak P is straddled by a pair of channels, or groups of channels, A and B which are selected by channel selecting gates 11. Thus, counts falling within the groups of channels A and B are transmitted by the channel selecting gates 11 to the digital scaler 12 whose content is N. The content N is accumulated in the scaler 12 by subtracting counts falling within group A and adding counts falling within group B. So long as the selected peak P remains centered between groups A and B, the average number of counts falling within each of the groups A and B will be the same and the average scaler content N will be zero. If due to drift the selected peak P should cease to be centered on the pair of channels A and B, then more counts will be counted in one group than the other and the scaler content will be greater or less than zero depending on the direction of the shift. The content of the scaler 12 is fed to a digital-to-analogue voltage converter 13, which generates an output voltage proportional to the digital input. This output voltage is indicated on the meter 14 and is applied to the apparatus generating the input spectrum or the multi-channel analyser to correct for the drift of the selected peak P.

As shown in FIGURE 1, the control voltage may be applied to control the high voltage or gain control of a detector or pre-amplifier, or may be applied to control the analyser bias or analyser gain. In accordance with the invention, any one of the variables in the pulse height analysing system may be controlled by the control voltage generated by the converter 13.

FIGURE 2 illustrates the arrangement of equipment for testing the ability of the stabilizer of the present invention to stabilize a spectrum in a 100-channel pulse height analyser. For this purpose, an americium ($Am^{241}$) source is located in a vacuum chamber 20, together with a detector 16. The output from the detector 16 is fed to a pre-amplifier 17 and a linear amplifier 18. The output from the linear amplifier 18 is fed into the 100-channel analyser 10, and as represented in FIGURE 2, the maximum output from the linear amplifier 18 has an amplitude of approximately 30 volts. The 100-channel analyser 10 is biased to 27 volts and the expander amplifier within the analyser is adjusted to give a range of 27 to 30 volts in pulse height over the 100-channel display. This gives an effective dispersion of .1% per channel. After an initial trial, gate A was set to channels 31, 32 and 33, and gate B was set to channels 35, 36 and 37, straddling the main peak. As before, the output of group A channels is subtracted from the contents of the scaler and the output of group B channels is added to the contents of the scaler and this content is converted by the converter 13 to a voltage proportional to the scaler content N. The voltage derived from the converter was applied to adjust the bias of the analyser 10 to maintain the selected peak centered between groups A and B. The equipment was then operated for 10 minutes without any artificially induced drift and the spectrum obtained is illustrated in FIGURE 3 by the channel counts plotted with small circles. The equipment was then operated for a further 10 minutes with an artificially induced drift voltage which was equivalent to a drift of one half channel per minute. The output spectrum operating in this manner with the stabilizer of the present invention in operation is illustrated in FIGURE 3 by the plot of small crosses. It may be seen that with the stabilizer of the present invention, a drift which would normally very greatly degrade the resolution of a pulse height analysis is stabilized so that substantially the same resolution is obtained. The results of the two operations of the equipment are summarized below:

Count rate in the peak channel≈190/counts minute.

*Run 1.—Stationary*

Duration—10 minutes.
Position of peak—(Weighted mean of counts)=33.977 channels, probable error ±.012 channel.
Measured width at half height=3.79 channels or 22.2 kev.

*Run 2.—Steady drift of .5 channel/minute, downwards*

Duration—10 minutes.
Position of peak—33.963 channels, probable error±.012 channel.
Measured width at half height=3.81 channels or 22.3 kev.

It can be seen that very little resolution has been lost by the introduction of the drift, which was approximately equivalent to 30 kev.

The stabilizer will thus deal effectively with a drift of 3% per hour at the relatively low counting rate of about 3 counts per second in the peak channel. For a closely spaced spectrum group such as that shown it is immaterial whether the shift arises from changes in gain or bias.

In order to ascertain the effectiveness of the stabilizer with scintillation counters using a photo-multiplier, the apparatus was connected substantially as shown in FIGURE 2, with a cesium 137 source replacing the americium 241 source and with a scintillator with photo-multiplier as the detector 16. A variable high voltage supply, associated amplifiers and the 100-channel analyser were used.

No bias was used and the stabilizer was connected so as to control the channel width of the analyser itself, that is, the effective system gain was controlled by varying the analyser conversion voltage.

The incremental change in channel width was designed to be about 0.1% per scaler count, and was measured as .155%.

In an initial trial, the change in high voltage supply required to produce a shift of about 10% in gain was found. The stabilizer was then set up, and a 5 minute run made, the H.T. being slowly and uniformly reduced over the predetermined range, the actual amount of shift being the equivalent of 9 channels, as shown in FIGURE 4. A second 5 minute run was then carried out with the H.T. stationary, and the stabilizer off.

The curves shown in FIGURE 4 illustrate the results of the two runs. It can be seen that the stabilized peak has remained approximately centered on the stabilizing line notwithstanding the large drift.

Because of circuit limitations only three channels on each side of the peak were used for stabilization and hence a full analysis of the curve is difficult. However, using the stabilizing line as reference, and considering the count rates in the selected channels, one can estimate the displacement as follows:

Assume the curve to be shifted downwards by one channel, then taking the analyser results:

|  | Counts |
|---|---|
| Total count, group A | 10,994 |
| Total count, group A | 11,796 |
| Total count, group A | 11,979 |
|  | 34,769 |
| Total count, group B | 10,963 |
| Total count, group B | 9,036 |
| Total count, group B | 6,795 |
|  | 26,794 |
| Group A−Group B | ≈8,000 |

Thus an excess of 8,000 counts would be available for correction purposes if a 1 channel displacement took place. In order to correct for a 9 channel (or 11.2%) drift, only a total of 11.2%/.155% or 72 counts over the 5 minute period are required. By simple proportion therefore, the average displacement will be:

$$72/8000 \Omega .009 \ channel$$

The low value of displacement is directly attributable to the large number of counts available for drift reduction, the counting rate being about 2,400 per minute in the peak channel.

Some slight broadening of the peak due to stabilizer action is apparent, the unstabilized peak having a half-height width of 9.5% compared with a width of 11.2% for the stabilized peak. The question of broadening of the peak due to stabilizer action is fully dealt with in the paper A.E.C.L. 1417, published February 16, 1962 by the present inventors.

Drifts in a biased amplifying system may consist of bias or gain changes, and any drift may be corrected by adjustment of two controls; bias and channel width. For perfect stabilization then, two reference points are required, peaks in a spectrum for example, and two separate stabilizing devices to control the two variables. The reference peaks should preferably be widely separated to obtain precise control.

When only a small portion of a spectrum is being examined, then any drift can be very largely compensated by a single stabilizer, controlling either the bias or detector gain.

In FIGURE 5, a 100-channel analyser 10 is shown connected to a stabilizer 19 and a representation of the input spectrum is shown in the circular portion in the block representing the 100-channel analyser 10. This input spectrum is represented as extending from channel 900 to channel 1000 with a peak X in channel 900, a peak Y at channel 950 and a peak Z at channel 1000. If the stabilizer is connected to hold the peak Y stationary by control of the analyser bias, any change in analyser bias will be perfectly compensated, but the compensation for gain changes is not quite so clear. Assume that the detector gain changes by 1%. Peaks X, Y and Z will tend to shift by 9, 9.5 and 10 channels, respectively. If the stabilizer is operating correctly, a correction of 9.5 channels will be applied, and peak Y will be restored to its former position while peaks X and Z will finally settle at .5 channel from their original position. Nevertheless, the drift due to gain changes at the extremities of the spectrum will still be reduced by a factor of 20.

Suppose the stabilizer is now connected to control the detector gain. Changes in detector gain will of course be perfectly compensated, but if bias changes occur, the extremities of the spectrum will again be distorted in a similar fashion to that described above.

Accordingly, there are three cases where different problems of stabilization occur. Firstly, if stabilization of a small section of a spectrum is required, say the upper 10%, it is immaterial whether bias or detector gain is controlled. The stabilized peak will be held stationary and distortion of other peaks will be small and proportional to their distance from the stabilized peak. Secondly, if stabilization of a complete spectrum is required, for example with no bias and small base line shift, then the gain of the detector of the analyser channel width must be controlled, and control of the bias need not be used. Thirdly, a stabilization of a large section of a spectrum, say the upper 50%, cannot be carried out with a single stabilizer and the only suitable arrangement is to use two stabilizers to control bias and gain separately. Such an arrangement is illustrated in FIGURE 6 which shows an analyser 10 to which an input pulse spectrum is applied, and a pair of stabilizers 19 and 19' connected to control the analyser bias and the analyser channel width. The stabilizer 19 is controlled by a peak in the spectrum toward the lower end of the analyser channels and the stabilizer 19' is controlled by a peak in the spectrum at the upper end of the analyser channels.

It will be appreciated that features other than peaks in the spectrum can be used as references. For example, well-defined valleys would be equally useful as the pairs of channel groups could be centered about such a valley. Conceivably, other features of the spectrum could also be used if they were carefully chosen so that equal pulse groups on either side of the feature could be obtained.

Referring to FIGURE 7, there is shown in schematic form the structure of a pulse height analyser and in particular the input conversion device of such an analyser. An input pulse to the analyser is stored on capacitor 30, and its arrival actuates a "start discriminator 31" which in turn, after a suitable delay, starts an oscillator 32 and a pump 33 which recharges capacitor 30 towards ground in a series of steps. When the potential across capacitor 30 crosses ground level, a "stop discriminator 34" stops the oscillator 32. The number of oscillations is therefore a measure of the pulse amplitude, and the number of pulses in the code train shown is the "channel number" in which the event is stored.

The conversion gain of this system is most conveniently varied by controlling the amount of charge fed to capacitor 30 by the pump circuit 33. A voltage input to the pump 33 sets the pulse amplitude, thus the staircase slope and therefore the channel number can be varied by control of this input.

With regard to "bias" control, a simple slicing circuit is used. The diode 35 is back-biased to an extent determined by the negative voltage fed to resistor 36. Only that portion of the input pulse which exceeds the negative bias will therefore be transmitted through to capacitor 30. Thus by varying the bias control voltage, it is possible to set the amount of slicing and in effect set the zero of the instrument.

FIGURE 8 illustrates the operation of the channel selecting gates shown as numeral 11 in FIGURE 1. In the analyser, channels are set up by two address registers, one "tens" and one "units." FIGURE 8 shows a section of the channel selecting gates, which are external, and do not affect normal analyser operation. Imagine that an input pulse has been encoded and is to be stored in channel 32. A voltage will be present at the "3" tens position and the "2" units position. These voltages will pass through selector switches $S_1$ and $S_2$ to the "and" gate 37 which will open gate 38, allowing the analyser storage pulse ("Add 1") to be passed to the reversible scaler. By suitable duplication of switches, any number of channels may be selected in this way.

A reversible scaler suitable for use with the present invention is a commercial unit manufactured by Navigation Computer Corporation and known as model 111B. This scaler is operated in the binary mode.

The digital to analogue voltage converter 13 provides output currents which are proportional to the significance of each binary stage of the scaler 12. The output currents from the converter are summed and passed to an amplifier which gives a voltage output. This voltage output is therefore linearly proportional to the scaler content N stored in the scaler 12. The technique of construction and circuits in both the scaler 12 and the analogue converter 13 are well known to those skilled in the art and will not be further detailed here.

We claim:

1. A method of stabilizing a variable gain, variable channel width multi-channel pulse height analyser system comprising selecting a pair of groups of adjacent channels straddling a selected naturally occurring feature of the pulse height spectrum being analysed, counting the number of pulses appearing in each group of channels during a predetermined period of time, providing an output proportional to the difference in the number of counts in said groups of adjacent channels, and varying a control variable of said pulse height analyser system in accordance with said output.

2. A method according to claim 1 wherein said selected naturally occuring feature is a peak of the output spectrum.

3. A method according to claim 1 wherein said selected naturally occurring feature is a valley of the pulse height spectrum.

4. A method according to claim 1 wherein said control variable is the analyser bias of said system.

5. A method according to claim 1 wherein said control variable is the analyser channel width of said system.

6. In a method of analysing a pulse height spectrum of nuclear radiations, the method of stabilizing said analysis comprising, selecting a pair of groups of adjacent channels straddling a selected naturally occurring feature of the pulse height spectrum to be analysed, counting pulses occurring in each of said groups of channels, providing an output proportional to the difference in the number of counts in said groups of channels, and varying a control variable of said system in accordance with said output.

References Cited by the Examiner
UNITED STATES PATENTS 3,101,409  8/1963  Fite _____ 250—83.3

RALPH G. NILSON, *Primary Examiner.*

JAMES W. LAWRENCE, *Examiner.*

S. ELBAUM, *Assistant Examiner.*